July 21, 1970          F. W. FUNKE          3,521,549
FOOD SMOKING APPARATUS
Filed Sept. 23, 1966
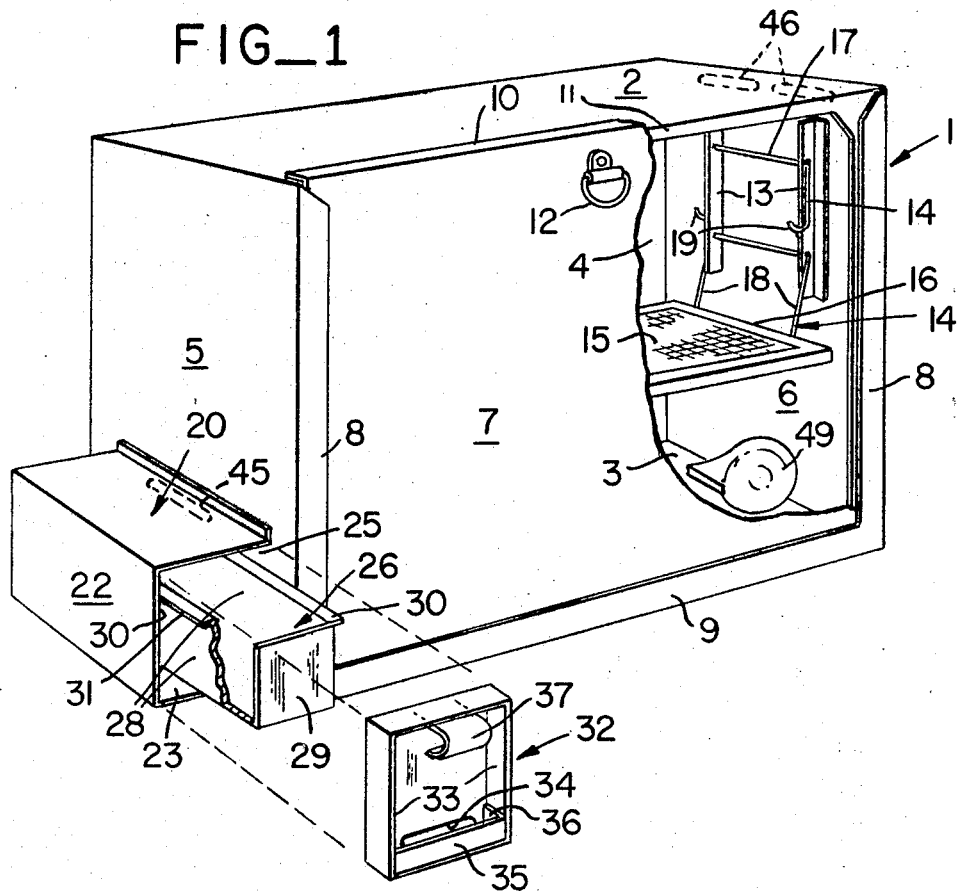
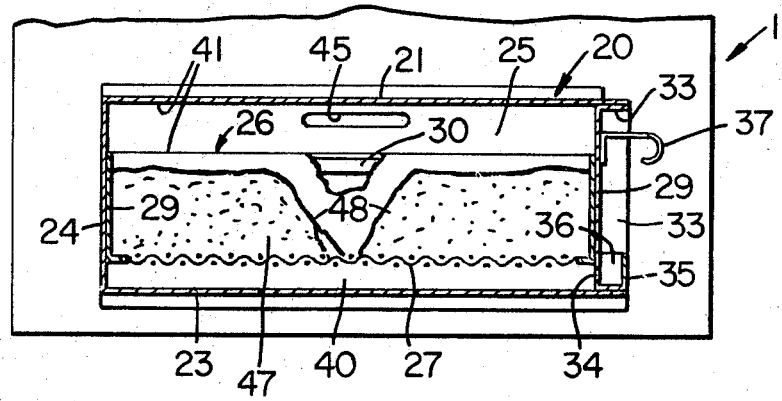
*INVENTOR.*
FRED W. FUNKE
BY Boykin, Mohler, Foster and Schlemmer
ATTORNEYS United States Patent Office 3,521,549
Patented July 21, 1970

3,521,549
FOOD SMOKING APPARATUS
Fred W. Funke, 3186 Coffey Lane,
Santa Rosa, Calif. 95401
Filed Sept. 23, 1966, Ser. No. 581,649
Int. Cl. A23b 1/04, 3/04
U.S. Cl. 99—259                                    7 Claims

ABSTRACT OF THE DISCLOSURE

A method and apparatus for "cold-smoking" foods in which a wet smoke pellicle is deposited on the food in a short time by means of said apparatus, which includes a rectangular combustion chamber having an open side within which is supported a perforate screen on which a charge of sawdust is held for combustion. The combustion chamber is fastened to the lower portion of a lateral wall of a rectangular smoking chamber, in which wall there is a restricted opening permitting communication between the combustion chamber and the smoking chamber. A perforate support means for the food is suspended in the smoking chamber between the restricted opening and a discharge outlet at a higher level in an opposite lateral wall of the smoking chamber. An air inlet is located in one end of the combustion chamber below the level of the screen which supports the sawdust. Areas of the various openings for draft and smoke passage are chosen to keep the temperature at a level which will not evaporate the moisture from air entering the smoke generator and smoke-house.

This invention relates to the smoking of food, and has for one of its objects the provision of a process of more efficiently and thoroughly smoking fish, meat and foods of various kinds within a very small fraction of the time heretofore required, and without corning or pickling the meat. By the present method, a wet smoke pellicle having a normaly satisfactory hickory smoke flavor will be deposited on steaks, chops and other cuts of meat, including fish, that do not substantially exceed approximately one and one-half inches in thickness, within thirty minutes' time. The depost of pellicle alone is not sufficient. There must also be a sufficient smoke flavor of the desired character.

Another object of the invention is the provision of a smoker that is adapted to accomplish the above results, or by which the process may be practiced, which smoker is compact, simple, easily cleaned and operated, extremely economical in operation, free from objectionable exhaust of smoke to the atmosphere, and safe to use with in a house, or outside where there may be wind and combustible material.

By the present process, the food, such as meat, is smoked while fresh and after smoking it is cooked in the usual manner. The smoke pellicle formed on meat, for example, encases the latter. The meat is not dehydrated by the smoking, or is it cooked in any manner, nor corned or pickled, and the pellicle is wet, adding moisture to the food instead of drying it. All food used in the present process should be surface-dried of free moisture before processing, in order to accomplish the desired smoking with the short time noted, and when the pellicle is formed, it is sufficiently effective in excluding oxygen to keep the fish, other meats, or smoked foods sweet for from ten to fourteen days in a conventional refrigerator without freezing it. If frozen, the time may be extended to the limit of any other frozen food.

The present method is called "cold-smoking." By conventional cold smoking processes, meat to be smoked is cut to the desired sized pieces, soaked in water, corned or salted, after which it may be rinsed and dried, which steps along may take from six to twenty-four hours and longer, and the smoking time thereafter may be from ten to twenty-four hours for a light cure, or up to five or six days for a heavy cure, according to the meat to be smoked. Fresh fish is one of the most commonly smoked food, and normally white-fleshed "lean" fish fillets weighing a pound or more take less time than salmon and the like, and the foregoing times do not take into consideration the time for obtaining a bed of coals or manipulating the fish during smoking. Also, in conventional cold smoking, it is recommended that the firebox be from ten to twenty feet from the smokehouse, so that the temperature of the smoke is kept below 100 degrees F. and preferably about 85 degrees F.

In cold smoking, the object is not to cook the meat, but to form a pellicle having the desired smoke flavor, that will be driven into the meat upon cooking it in the conventional manner. As already mentioned, by the process of this invention the pellicle is wet, so the meat is not dried out as occurs in ordinary processes where the meat, just before smoking, sometimes dried for from three to six hours in a breeze or by forced draft from a fan.

The main objects of the invention are the provision of a method that will accomplish the advantages and desirable results above mentioned, and the provision of a smoker that will automatically carry out the steps, once the food is placed in the smoker and the fuel is ignited.

Other objects and advantages will appear in the description and drawings.

In the drawings, FIG. 1 is a perspective view of the smoker as seen from the front side, with part of the front closure plate broken away to show part of the interior and with the sawdust holder of the smoke generator partially withdrawn and broken away, and with the front cover plate of the smoke generator in exploded position in front of the open front end of the smoke generator.

FIG. 2 is a fragmentary, enlarged vertical sectional view taken through the fully assembled smoke generator.

The words "front," "forward," "rear," and "rearwardly" or words of similar meaning, are used with reference to the open side of the smokehouse and the open side of the smoke genarator when their closures are removed, said open side being the forward or front side of the smoker.

The smokehouse shown in FIG. 1 is generally designated 1, and is rectangular, having a top wall 2, bottom wall 3, a rear wall 4 and opposed vertical end walls 5, 6. A removable front closure plate or wall 7 closes the front side of the smokehouse, being in opposed relation to rear wall 4. The front wall 7 is held in position along its vertical edges in opposedly opening channels along the forward edges of end walls 5, 6, the forward side of each channel being a flange 8 along the front vertical edges of end walls 5, 6 for sliding said front wall upwardly to open the front side of the smokehouse. The lower marginal portion of the front wall 7 extends behind upwardly extending flange 9 along the forward edge of bottom wall 3 and the interior of the smokehouse, while the upper marginal portion 10 of the front wall is extended rearwardly to overlie the forward marginal portion of the ton wall 2. By this arrangement the closure plate is substantially smoke tight relative to the interior of the smokehouse when in closed position, but may be readily slid upwardly and removed to open the front side of the smokehouse 1.

The front marginal portion of top wall 2 may be bent downwardly to provide a flange 11 that will be in face-to-face relation to the upper vertically disposed marginal portion of front wall 7 adjoining flange 10, and said wall 7 may be provided with a ring 12 adjacent to its upper edge and centrally between its side edges, or other suitable means, for manual grasping or engagement, for lifting the front wall 7 to remove the latter or to open the front wall of the smokehouse to view the contents.

A pair of horizontally spaced, vertically disposed, parallel angle strips 13 in side-by-side relation may be secured on each of the end walls 5, 6 with one of their flanges directed inwardly, and each pair swingably support an upper and a lower hanger 14 for respectively removably supporting a load carrying horizontal grill or screen 15 at its ends 16, within the smokehouse at different levels, or a pair of said grills may be supported within the smokehouse at the same time. Obviously, provision for any number of such hangers and grills may be made according to the side and height of the smokehouse.

Each hanger 14 comprises an inverted generally U-shaped member, the bend 17 being straight and rotatably extending through openings in the inwardly projecting flanges on the angle strips 13. Legs 18 of each hanger depend from the ends of each bend 17 and each leg has an upturned hook 19 adapted to engage under each end member 16 of the grill. Each such end member 16 may be an angle or channel strip having a depending flange under which hooks 19 extend.

The lower ends of the hangers are normally swung inwardly or toward each other for engagement with hooks 19 for supporting said grill spaced from the end walls 5, 6 and from the rear wall 4 and front closure 7. This spacing provides for unobstructed flow of smoke throughout the smokehouse as well as facilitating the handling of the grill.

Along the lower portion of end wall 5 is the smoke generator, generally designated 20. This generator comprises a horizontally elongated rectangular housing having a top wall 21, a vertical side wall 22, a bottom wall 23, and a rear end wall 24 (FIG. 2).

The side wall opposite to wall 22 is a portion 25 of the end wall 5 of the smokehouse, and the free edges of top wall 21, bottom wall 23, and end wall 24 may be welded to said wall 5 with the lower wall 23 spaced above the lower edge of end wall 5 of the smokehouse so that the smoke generator will be supported in a position spaced above a surface on which the smokehouse is supported.

A horizontally elongated sawdust holder, generally designated 26 approximately corresponding in length to the length of the generator housing is adapted to be slid lengthwise thereof into the generator housing through the front open end of the latter, which open end is preferably spaced rearwardly of the front of the smokehouse, as seen in FIG. 2.

The holder 26 has a screen bottom 27, imperforate opposed, horizontally elongated side walls 28, and imperforate end walls 29, and may be supported on any suitable horizontally extending supports 30 secured on the side walls of the housing 20 for sliding the sawdust holder lengthwise thereof into and out of the housing 20. Flanges 31 projecting oppositely outwardly of the side walls 28 of the holder along their upper edges are adapted to be supported on supports 30 for said sliding, and for supporting the holder with its side walls 28 spaced from the adjacent side walls of the housing 20, and with the bottom 27 of the holder spaced above the bottom wall 23 of housing 20.

The housing 20 includes a removable front closure 32 that is formed with forwardly projecting flanges 33 along the edges thereof to provide a wedge fit within the front open end of the housing 20, with said flanges in frictional engagement with the walls of the housing 20 so that the front wall will be held in spark and ash-tight engagement with said housing walls, and will not be accidentally blown open or released to permit escape of sparks or ashes or to render the device inoperable for functioning in its intended manner, as will later be explained.

The lower portion of the closure 32 is formed with a horizontally elongated air inlet 34 that extends substantially the full width of said closure, and a flat horizontally elongated vertically disposed strip 35 extends across the forward side of said air inlet in a position spaced outwardly or forwardly of said closure and inlet and along the forward edge of the lower flange 33 on said closure. Rearwardly extending end portions 36 of said strip are rigidly secured to the lower ends of side flanges 33. By this arrangement the strip 35, end portions 36 thereof, and lower flange 33 will provide a pan for catching any sparks or ashes that might fall through air inlet 34, and strip 35 and its end portions 36 will also form a baffle extending across the forward side of said inlet over which ambient air must pass for downward movement to such passing, to enter said inlet 34 thus reducing the velocity of the air at the inlet which is important in controlling the rate of combustion, or holding it in check.

Closure 32 is provided with forwardly projecting, finger engageable member 37 for use in removing the closure 32 and in replacing it.

The smoker may be of any desired size, however, as an actual example of a smoker for home or apartment use, the smokehouse itself may be approximately 10" x 10" x 18" with a generator housing approximately 2½" square and 6" long, and the holder 26 may be approximately 2⅛" wide, 1½" deep and 5⅝" long and approximately the same with approximately a ¼" space 40 between the screen 27 of the sawdust holder and the bottom wall 23 of the generator housing 20 and a space 41 of approximately ⅝" between the top of the holder and the top wall 21 of the housing 20. A unit of this dimension has a food supporting area on each grill or screen 15 of approximately 9" x 16" or 1 sq. ft. per screen.

In a smoker of the above dimensions, the air inlet 34 in the front closure opening into space 40, which inlet as shown in FIG. 1 is preferably in the form of a horizontally elongated slot having a total area of approximately 0.9 square inch, or a dimension of 7/16" x 2 1/16", while the portion of wall 5 that comprises side wall 25 of the generator housing is formed with a horizontally elongated slot 45 directly communicating between the space 41 above the sawdust holder and the interior of the smokehouse 1 below a food supply screen 15 when the latter is in its lowermost position. The total area of the slot 45 is approximately 0.853 square inch and the vertical dimension of the smoke collecting chamber 41 is approximately ⅝". Wall 6, which is opposite to wall 5, is formed with an outlet adjacent to top wall 2, which outlet may comprise a pair of horizontally elongated and aligned slots 46 having a total area of approximately 0.5472 square inch. The slot 45 may be called the smoke inlet, since it admits the smoke from the generator in to the smokehouse 1.

The slot 45 is positioned centrally between the front and rear ends of the generator housing and midway between the front and rear sides of the smokehouse.

From the foregoing it is seen that the area of the outlet 46 of the smokehouse is equal to approximately 50 percent of the area of the smoke inlet 45, while the area of the air inlet to the smoke generator is approximately 100 percent of the area of said smoke inlet 45.

Other important considerations are the character of the sawdust, the combustion area and the arrangement of the sawdust in the sawdust holder.

The differential in temperature between the smoke inlet 45 and the outlet 46 in the smokehouse 1 should be only sufficient to maintain a light flow of smoke through the smokehouse, and since all air entering the generator must pass through the screen at the apex of the V in the bed of sawdust, and should only be sufficient to maintain combustion of the sawdust along the apex of the V, the size of the air inlet is important. Thus the air inlet 34 is balanced, in size, to regulate the rate of combustion and heat generation at the combustion point. Too much air would accelerate combustion, create too much heat, and reduce the smoke generation period. The heat in the smoke generator must not evaporate the atmospheric moisture entering the generator and passing into the smokehouse. By controlling the size of the air inlet 34 relative to the smoke inlet 45, as described, an extremely wet vapor of substantially atmospheric temperature and heavily charged with smoke, passes through th smoke inlet 45 into the smokehouse. Inasmuch as the vapor entering the smokehouse is very wet and its movement in the smokehouse is slow, and is across the food therein, the vapor is deposited on all surfaces exposed to it. This wet, heavily smoke-charged vapor is very concentrated and dense in the smokehouse, and the ratio between the area of the smoke inlet 45 and the outlet 46 is essential to maintaining the density of the smoke in the smokehouse and its effective deposit on the food through regulating the flow through the smokehouse only to a degree whereby the rate of flow of smoke through smoke inlet 45 is sufficient to maintain a slow combustion in the generator with a minimum of heat.

Sawdust from the various hard woods suitable for smoking and blends thereof and which excludes the soft woods because of their resinous nature that deposit an acrid flavor and odor to the product, have been tried and pure hickory sawdust has been found to be the only one that produces the desired results of proper combustion with minimum heat and desired smoke generation to form the desired wet pellicle having the desired hickory smoke flavor on the food within a short time. The proper maintenance of combustion is essential.

In operation, hickory sawdust is placed in the sawdust holder and a V-shaped recess 48 (FIG. 2) is formed in the sawdust substantially centrally between the end walls 29 of the holder and to screen 27, the screen being at the apex of the V.

The sawdust is ignited by placing a few drops of lighter fluid on each of the sides of the V recess 48 and lighted with a match while the holder 26 is outside the generator and as soon as the flame disappears the sawdust will commence to smoulder and a good smoke column will build up, whereupon the holder is inserted into the generator housing and the closure 32 placed over the open front end and against the forward wall 29 of the holder, so that all of the air from inlet 34 must pass through screen 27 and the sawdust. The screen 15 with the meat cuts or food to be smoked supported thereon in spaced relation to each other is then inserted into the smokehouse, and the wall 7 positioned over the front side to close it. Within five minutes a smoke column will appear at the vents and within thirty minutes' time the desired pellicle of excellent hickory smoke flavor will be produced. Obviously a longer smoking period will produce a heavier smoke flavor but a smoking period of approximately thirty minutes will produce a normal smoke flavor.

A substantially filled sawdust holder will produce adequate smoking for approximately two hours in a holder of the size noted, hence a number of batches of food may be smoked with one filling, and the user will readily determine the amount of sawdust for a thirty-minute smoking period or longer.

Combustion of the sawdust 47 (FIG. 2) commences at the screen line or substantially at the apex of the V 48, and as combustion proceeds in opposite horizontal directions at this level, ash is created and the support for the sawdust above said line is removed and it progressively moves down to the combustion line. The ash following combustion seals the screen as combustion continues, so that the area for passage of air through the screen is not greatly increased. Excess ash will drop through screen 27 into the chamber 40 therebelow. The actual area in combustion is quite low, hence it is controllable by the balanced relation between the air inlet 34 and vent system including discharge openings 46. The structure as described makes possible the use of lesser amounts of sawdust for shorter periods of smoke generation without objectionable acceleration of the rate of combustion.

The air that passes through screen 27, but by-passes the points of combustion, will rise to the collection chamber 41 above the sawdust, and its moisture absorbs the smoke and passes into the smokehouse, and assists in holding internal temperatures in the smokehouse down by absorbing heat from the generator at a point removed from the points of combustion.

The circulation of smoke within the smokehouse may be accelerated, if desired, by the employment of a fan or blower 49 within the smokehouse without affecting the rate of combustion. This would speed up the formation of pellicle, and while such blower is not essential to the smoking within the time hereinbefore mentioned, its use, particularly in restaurants or the like, would be desirable. A blower 49, or any other suitable air circulating device, is indicated in FIG. 1, and its position may be varied as found to be most suitable with respect to the load in the smokehouse.

From the foregoing it is seen that, in general, the smoker comprises a conduit formed by the combustion chamber and the smoke chamber with an air inlet at one end into the combustion chamber, and an outlet at the opposite end from the smoke chamber, with a restricted passageway 45 between said combustion chamber and the smoke chamber. The area of the inlet 34 is substantially greater than the area of either the outlet 46 or the passageway 45 and the ratio between the areas, i.e. the inlet, passageway, and outlet areas, is such as to maintain substantially only progressive smoldering combustion of a substantially uniform amount of a body of sawdust on a perforate support at a substantially uniform rate, and to maintain a flow of smoke from said combustion chamber into and through said smoke chamber at a substantially uniform rate to said outlet at a temperature in said combustion chamber and in said smoke chamber adapted to absorb and carry atmospheric moisture from air admitted to said combustion chamber through said inlet, whereby the smoke adapted to pass into said smoke chamber will be relatively wet.

The rate at which combustion is maintained in the combustion chamber is important in that the atmospheric air must not be dried. All of the air entering the combustion chamber is not used for combustion, but the air supplied to the line of sawdust along one or both edges of the body of sawdust should remain substantially uniform so as to prevent a substantial rise in the temperature of the air above the body of sawdust.

The method of automatically controlling the rate of combustion of the sawdust is believed to be novel, and in this method the balance between the air inlet and the passageway into the smoke chamber and the outlet are important. If a flame is produced the air will be dried and the rate of combustion will be rapid. The arrangement in which combustion is progressive along a relatively thin portion of the body of sawdust and which portion is automatically replenished with fresh sawdust as the line of combustion progresses in the direction of the body automatically maintains a substantially uniform flow of air to the line of combustion.

It is to be understood that modifications coming within the spirit of the invention may occur to those skilled in the art, hence it is intended that no limitations be placed on the invention beyond the scope of the appended claims.

I claim:

1. In a smoker for smoking food that includes a conduit having an inlet for atmospheric air at one end thereof and an outlet for smoke at the opposite end and a restricted passageway spaced between said inlet and said outlet to provide a combustion chamber for sawdust between said inlet and said passageway and a smoke chamber for food between said passageway and said outlet;
 (a) perforate means spaced within said smoking chamber for supporting food to be smoked,
 (b) a perforate support within said combustion chamber for supporting sawdust to be burned for producing smoke,
 (c) said inlet being in said combustion chamber below the level of said perforate support, and said passageway being above the level of said perforate support and below the level of said perforate means, and said outlet being above the level of said perforate means,
 (d) the area of said inlet being greater than the area of either said outlet or the area of said passageway, and the ratio between said areas of said inlet, passageway and outlet and their positions relative to each other being such as to maintain progressive smoldering combustion of a substantially uniform amount of a body of sawdust on said perforate support to maintain a flow of smoke from said combustion chamber into and through said smoke chamber at a substantially uniform rate to said outlet at a temperature in said combustion chamber and said smoke chamber insufficient to vaporize the moisture in the atmospheric air entering said combustion chamber through said inlet and passing through said combustion chamber and said smoke chamber, and said conduit being closed to entry of heat, gas and air into said smoke chamber other than the atmospheric air entering said inlet and the heat in the smoke generated in said combustion chamber, when said smoke chamber is closed for smoking food, whereby the vapor adapted to pass into said smoke chamber will be relatively wet and substantially saturated with smoke for deposit on food within said smoke chamber.

2. In a smoker as defined in claim 1;
 (e) the said area of said inlet being approximately 90 to 100 percent greater than the area of said outlet and the area of said outlet being approximately 55 to 60 percent less than the area of said passageway, and the area of said passageway being approximately .9 square inch where the space within said smoke chamber is equal to approximately 1800 cubic inches.

3. In a smoker as defined in claim 1;
 (e) said smoke chamber having a top wall, a bottom wall, a pair of spaced opposed lateral walls, a front and a rear wall;
 (f) said combusion chamber being adjacent to said bottom wall and said passageway being adjacent to said bottom wall and comprising an opening formed in one lateral wall of said pair substantially closer to said bottom wall than said top wall,
 (g) said outlet being in the upper portion of the other lateral wall of said pair.

4. In a structure as defined in claim 3;
 (h) said combusion chamber being horizontally elongated and having a top wall, a bottom wall, a side wall and a pair of spaced opposed end walls and positioned against and extending longitudinally alongside said one lateral wall of said smoke chamber with said side wall of said combustion chamber in spaced parallel opposed relation to said one lateral wall and with said opening approximately intermediate said pair of end walls,
 (i) one end wall of said combustion chamber being removable for withdrawal of said perforate support therefrom, and the latter extending from one end wall of said pair to the other and from said side wall of said combustion chamber to said one lateral wall to restrict the flow of air from said inlet through said perforate support to said passageway,
 (j) said inlet being in said one end wall.

5. In a structure as defined in claim 3;
 (h) means supporting said front wall of said smoke chamber for removal to permit access to the interior of said smoke chamber for loading and unloading said perforate means,
 (i) said front wall of said smoke chamber and said one end wall of said combustion chamber being at the same side of the said smoker, and
 (j) means for removably suspending said perforate means within said smoke chamber spaced from said lateral, front and rear walls.

6. In a smoker as defined in claim 4;
 (k) means on said one end wall of said combustion chamber in horizontal spaced relation from the latter and from said inlet extending across the latter to provide a baffle for slowing the rate of flow of ambient air to said inlet,
 (l) said perforate support being substantially closer to said bottom wall of said combustion chamber than to said top wall of the latter, and upstanding walls around the edges of said perforate support for retaining a body of sawdust on the latter for movement therewith, relative to the walls of said combustion chamber, and the said perforate support being a screen adapted to support thereon sawdust and ashes resulting from the combustion thereof whereby an exposed area of said screen free from sawdust will remain approximately the same during burning of said sawdust in a direction away from said exposed area.

7. In a smoker for smoking food, comprising;
 (a) a rectangular smoke chamber having vertically extending front and rear walls in spaced opposed relation, a bottom wall and a pair of vertically extending lateral walls normal to said front and rear walls in spaced opposed relation,
 (b) a rectangular, horizontally elongated combustion chamber secured against one lateral wall of said smoke chamber above and adjacent to said bottom wall of the latter and extending longitudinally in a direction between said front and rear walls, said combustion chamber having spaced opposed end walls, a top and a bottom wall and a side wall in spaced opposed relation to said one lateral wall of said smoke chamber, and the height and widths of said side wall and said top and bottom walls respectively being a relatively small fraction of the height of said one lateral wall,
 (c) a horizontal food supporting screen within said smoke chamber removably supported at a level intermediate the top and bottom walls of said smoke chamber,
 (d) a horizontal sawdust supporting screen within said combustion chamber removably supported at a level intermediate the top and bottom walls of said combustion chamber, said sawdust supporting screen extending across the space between said end walls and said side wall and said one lateral wall,
 (e) one end wall of said pair thereof and the front wall of said smoke chamber being at the same side of said smoker and facing in the same direction, and separate means respectively supporting said one end wall and said front wall for removal from said combustion chamber and from said smoke chamber,
 (f) a smoke opening formed in said one end wall at a level below the level of said sawdust support providing an air inlet to the space below said sawdust support,
 (g) a discharge opening for smoke formed in said one lateral wall at a level above the level of said sawdust support and below the level of said food support and approximately midway between said end walls communicating with the space in said combustion chamber above said sawdust support, for passing smoke form said combustion chamber into said smoke chamber,
(h) an outlet for smoke formed in the other lateral wall that is opposite to said one lateral wall, positioned adjacent to the upper end of said other lateral wall,
(i) the area of said air inlet, and said discharge opening for smoke, respectively, being approximately 90 to 100 percent greater than the area of said outlet and the area of said outlet being approximately 55 to 60 percent less than the area of said discharge opening for smoke.

References Cited

UNITED STATES PATENTS 549,017   10/1895   Prewitt _____ 126—59.5
3,316,831   5/1967   Koland et al. _____ 99—261

WILLIAM I. PRICE, Primary Examiner
J. M. BELL, Assistant Examiner

U.S. Cl. X.R.
99—229